United States Patent Office 3,454,028
Patented July 8, 1969

3,454,028
HYDRAULIC VALVE UNIT FOR USE IN
HYDRAULIC SYSTEMS
Johannes Vagn Baatrup, Sonderborg, Denmark, assignor to Danfoss A/S, Nordborg, Denmark, a company of Denmark
Filed July 11, 1966, Ser. No. 564,065
Claims priority, application Germany, July 9, 1965, D 47,697
Int. Cl. G05d 7/00, 9/00; F16k 17/26
U.S. Cl. 137—102                                    7 Claims

ABSTRACT OF THE DISCLOSURE

A unitary hydraulic valve unit in which four paired valves are disposed coaxially in a single housing bore arranged symmetrically functioning as suction valves, back pressure check valves, relief valves and form a control unit executing the different control functions with the same valves.

---

The present invention relates to a hydraulic valve unit and more particularly to a valve unit for use in hydraulic control systems. In an important aspect, the invention relates to such a hydraulic valve unit having a pair of valve bodies for use as back-to-back check valves or back pressure relief valves in a hydraulic line.

Valve unit combinations of the type of the present invention are useful, for example with power steering units for automotive vehicles and the like. If the wheel, or the element to be controlled hydraulically, is moved by an outside force, as it may occur if the wheel in a power steering unit for an automobile hits a projecting rock or hole, the piston of the power cylinder controlling the wheel is displaced. Displacement in the working cylinder causes displacement of the control liquid, such as hydraulic fluid, or the like, from one side of the piston and requires supply of the hydraulic fluid to the other side. Since ordinarily the piston rod of the control system is brought out of the cylinder on one side, the amount of fluid to be supplied to one side is different from the amount displaced on the other. As will appear hereafter, the back pressure relief valves must be capable of leading off the fluid from the one side and supplying the other side of the pitson with sufficient oil or fluid.

It has been customary to utilize back pressure relief valves which are interconnected by means of suitable hydraulic lines. This requires substantial interconnection of parts, as well as comparatively large amount of space. It has further been proposed to combine a pair of back-to-back relief valves in such a manner that they are located concenrtically. This, however, has the disadvantage that the relief valves have different diameter and thus a different pressure surface. This makes dimensioning and adjustment of the valves difficult.

It is an object of the present invention to provide a hydraulic valve unit combination which is simple to construct, utilizes but little space, and in which the valve seats can have the same dimensions; and which, further, can readily be combined for combination in a hydraulic system and with other valves and elements used therein.

Briefly, in accordance with the present invention, the hydraulic valve unit comprises a housing having a central bore, preferably formed with shoulders at either end so that the bore terminates in enlarged end portions. A valve body, of drum shape, is inserted in the bore, the valve body has a projecting ring, or collar bearing against the shoulders in the bore. Valve seats are formed on end faces of these bodies, and valves are seated against the valve seats of each body. A central spring, located in a central bore, presses the inner valves against the inside valve seats. The outside valve seats are supplied with valves pressed thereagainst by springs in turn bearing against plugs or the like closing off the bore.

The bore itself is formed with the ducts internally thereof for connection to the check valves of the system, or to other portions of the system.

The tubular body, which can be thought of as having circumferential recesses at both ends leaving a centrally located projection, has bores formed therethrough terminating on one side at a face of the body and on the other side beyond the projection at a circumferential recess. With the exception of the bore, which thus is inclined with respect to the central axis of these bodies, they are symmetrical and can readily be manufactured. Insertion of these elements in the wrong direction will not alter the operation of the entire mechanism and system thus providing assurance of effective use.

The structure, organization and operation of the invention will now be described more specifically in the following detailed description with reference to the accompanying drawings, in which.

Figure 1:
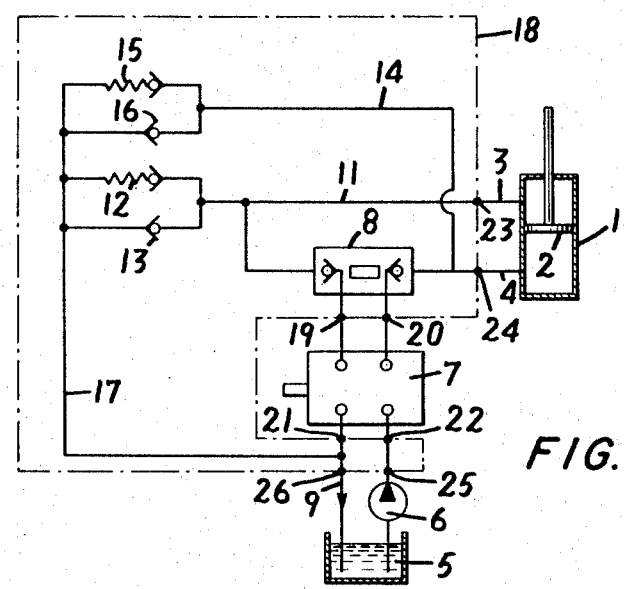
FIG. 1 is a connecting diagram, in schematic form, illustrating the arrangement of the valves in a hydraulic control system.

Referring now to the drawings and more particularly to FIG. 1: Power piston 2, arranged within power cylinder, is connected by means of hydraulic input and return lines 3, 4. As can be seen, the amount of fluid passing in the space above piston 2 will be less than the amount of fluid displaced below piston 2, if piston 2 moves up and down in cylinder 1, due to the presence of the piston rod as indicated in the drawing. Power cylinder 1, normally, is supplied with pressure fluid from a supply or sump 5 over a pump 6, a control unit 7 and a hydraulic back stop or back pressure or check valve 8, and then to line 4. The return flow is over line 3, line 11 and back through back pressure valve 8, control unit 7 and return line 9. The direction of flow to move the piston upwardly is indicated by the arrow in return line 9. The back pressure lock 8 insures, as is known, that over pressure within cylinder 1 cannot affect the control unit 7 or pump 6.

Line 3 has further connected thereto a pair of back-to-back connected back pressure valves, by means of line or duct 11. An over pressure-back pressure valve 12, and suction back pressure valve 13 are provided; line 4 is connected by means of duct 14 to a second pair of back-to-back connected back pressure valves, mainly over pressure valve 15 and suction back pressure valve 16. Valves 12, 13, 15 and 16 are connected to a joint return line 17, connected in turn with return line 9.

All the valves 12, 13, 15 and 16, as well as the hydraulic back pressure lock 8 and the associated ducts, are arranged in a joint housing indicated at 18 in FIG. 1 in dot-dashed outline. Four connection points 19, 20, 21, 22 interconnect the valve housing with the control unit 7; a pair of connection points 23, 24 connect to the power cylinder and another pair of connection points 25, 26 connect to the pump 6 and to the return line 9 and the sump 5, respectively.

The ducting diagram clearly shows that when piston 2 is displaced forcibly, for example downwardly, by an external force, oil is displaced over lines 4, 14 which can escape over the overpressure valve 15; oil can be supplied to the upper face of piston 2 by means of suction back valve 13 and line 11. The excess of oil being displaced below the piston 2 can escape over duct 17 and line 9 to the sump or supply reservoir. If an external force is applied to the piston 2 in the reverse direction, that is upwardly in FIG. 1, the oil displaced by the cylinder can escape over back-over pressure valve 12 and the suction back valve 16 can supply oil to the space below piston 2; the remaining amount of oil necessary to be supplied below the space can be obtained over lines 9–17 from reservoir 5.

Figure 4:
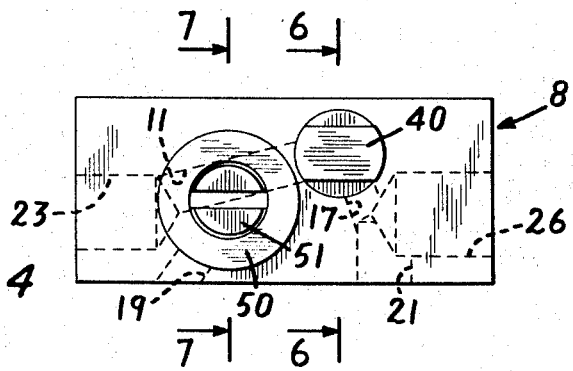
FIG. 4 is a side view of the housing of the connecting block.
Figure 5:
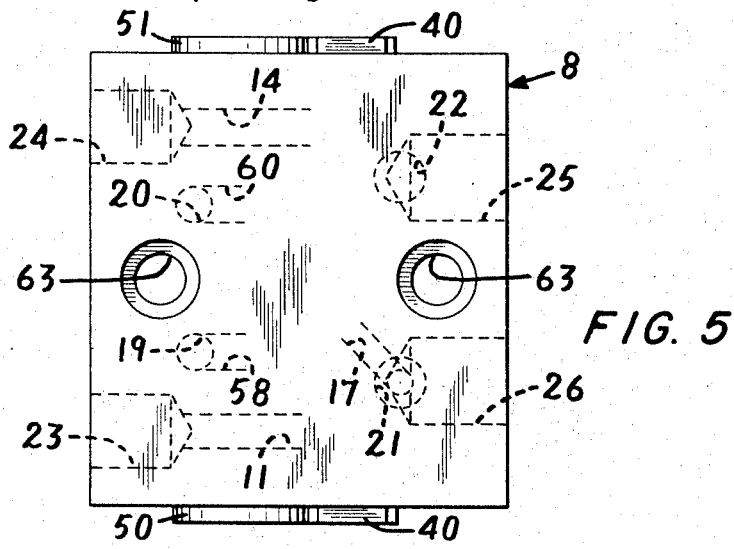
FIG. 5 is a top view of the housing of FIG. 4.
Figure 2:
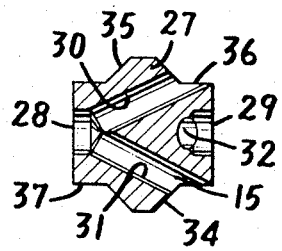
FIG. 2 is a longitudinal sectional view through a valve body.
Figure 3:
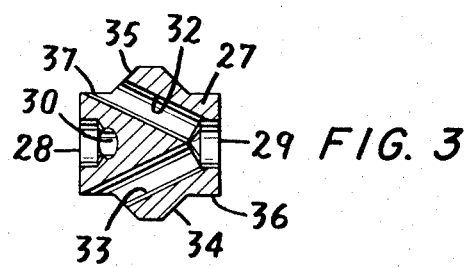
FIG. 3 is a view similar to FIG. 2, but rotated 90° with respect to FIG. 2.
Figure 6:
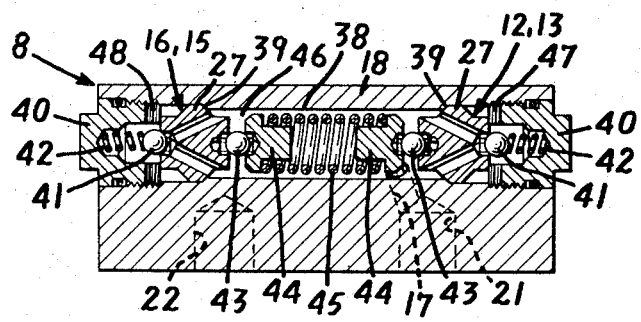
FIG. 6 is a vertical sectional view along line A—A of FIG. 4.

The valve elements 12, 13, 15, 16 are shown in greater detail in FIGS. 2 and 3 and their combination in an entire unit in FIGS. 4, 5 and 6. FIGS. 2 and 3, which are identical except for a 90° twist in FIG. 3, with respect to FIG. 2, illustrate a valve body 27 in tubular or drum shaped form having a pair of end faces, symmetrical with respect to a central axis, on which valve seats 28, 29 are formed. From each one of the valve seats, a pair of inclined bores 30, 31 and 32, 33 lead towards the other end face. Bores 30, 31 and 32, 33 are displaced with respect to each other by 90°. There inclination may be about 30° with respect to the central axis. They terminate at the outer edge 34, 35 in the region of a circumferential recess 36, 37. Bores leading from one valve seat towards the face, adjacent the recess on the other side are offset with respect to each other by 90°, so that a pair of bores, in planes 90° apart, are formed.

FIG. 6 best illustrates how the unit is constructed. Housing 18 is formed with a bore 38. The valve bodies 27 seat with their projections 35 against a shoulder 39 formed in the bore 38. An end cap 40 screwed into the bore and sealed therein, for example by an O-ring, has a central recess in which a spring 42 is located pressing a ball valve 41 against the valve seats formed on the faces of the unit. Spring 42 and cap 40 retain the body 27 within the bore.

The other side of the valve body, having valve seats 29, have ball valves 43 applied thereagainst; ball valves 43, forming the over pressure-back up valves, are retained in position by means of a terminal washer 44 inserted at both ends of a central spring 45. The central portion of the bore 39, as best seen in FIG. 6, is slightly smaller than the terminal portions thereof, in order to provide the shoulders against which the valve bodies 27 can seat. The space 46 surrounding the spring 45 within bore 38 is connected by means of internal duct 17 to connection points 21, 26, as schematically illustrated. The space 47, 48 formed between the valve bodies 27 and the caps 40 is connected over the ducts 11, 14 with connection points 23, 24, as best appears in FIGS. 4 and 5.

Figure 7:
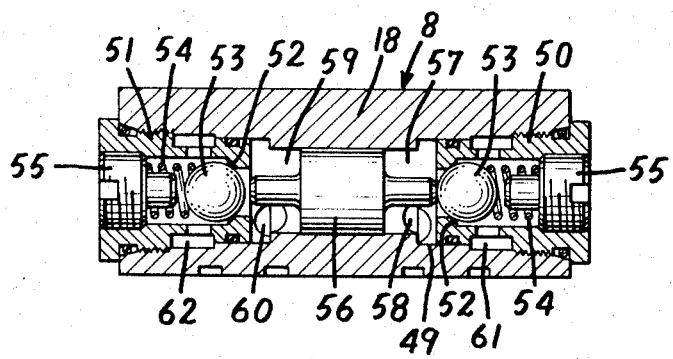
FIG. 7 is a sectional view along line B—B of FIG. 4.

The housing 18, besides entirely incorporating the over pressure and suction back up valves 12, 13, 15, 16, as above described, also contains the back pressure check, or lock valve 8. FIG. 7 shows the details of construction of lock valve 8. Within a bore 49, formed in housing 18, a pair of threaded end caps 50, 51 are screwed which each are formed with a valve seat 52, a valve ball 53 and a biassing spring 54, the tension of which can be adjustably regulated by means of end screws 55. Centrally, within bore 49, a piston 56 is slideably inserted. The space at the right of the piston is connected by means of a bore 58 with connection point 19 (FIG. 5) whereas the space 59, at the left of the piston (FIG. 7), is connected by means of a bore 60 with connection point 20 (FIG. 5). Space 61, beneath the cap 50, is connected with bore 11, and space 62, beneath the cap 51 (FIG. 7), is connected to the bore 14 (FIG. 5).

In operation, if oil under pressure is supplied over connection point 20, it is conducted over bore 60 into the space 59 and presses the left ball of valve 53 to the left and further the piston 56, and with it right side ball 53 to the right (FIG. 7). Thus, both valves are open and oil under pressure can circulate normally, in both directions. If, however, an increase in pressure occurs at the connection points 23 or 24, both valves of the hydraulic back pressure or lock 8 close and balance of the system can be achieved only over the over pressure-suction back up valves 12, 13, 15, 16.

The construction as above described enables assembly of all valves in a single unit, utilizing but very little space, which can readily be mounted directly in control unit 7. Screws 63 (FIG. 5) are provided for such close mounting. It is sufficient if the housing is provided with suitable sealing means and press fitted on the housing of the control system itself, in order to obtain a tight connection therewith. It is then only necessary to connect the power cylinder, the pump, and the reservoir or sump to the entire system, by connection points 23, 24, 25, 26 (see both FIGS. 1 and 5).

It is not necessary that both valves 12, 13 and 15, 16 are connected back-to-back and biased by a single spring 45 as shown in FIG. 6; the spring may be backed up against a plug within the housing and the valve unit at the right of FIG. 6 can be mounted independently from that of the left. The construction as shown in FIG. 6, however, provides four valves in a minimium amount of space. In essence, the invention thus provides a housing 18 formed with a bore therein; a valve 27 is inserted in the bore of the housing body 18; the valve has a central axis and a pair of opposed faces which valve seats 28, 29 are formed. The valve body is further supplied with longitudinal bores inclined with respect to the central axis and leading on the one side to a valve seat of one face and on the other side beyond the valve seat. Valve elements, balls 41, 43, are maintained in position by springs 42, 45, respectively, then compelte the individual valve units.

The entire assembly, particularly if the housing is formed with a flat face, can readily be maintained on a hydraulic control unit, with outlets at the flat face matching hydraulic connections of the control unit.

I claim:

1. A unitary hydraulic valve unit comprising, a single housing having a closed first bore extending therethrough, a pair of valve bodies axially spaced in said first bore effectively dividing said bore into three spaces comprising two outermost spaces and an intermediate sapce, each body having a pair of seats on opposite sides thereof and two pairs of diverging, angularly spaced passageways extending through each of said valve bodies and diverging from the axis of said first bore, each pair of passageways terminating and converging at a respective one of said seats, each valve having one of said valve seats disposed in said intermediate space another of said seats in one of said outer most spaces, for each seat a ball valve received in each seat, said bore having a pair of shoulders axially spaced on said bore, first resilient means in said intermediate space biasing the ball valves against seats in said intermediate space, and second resilient means in each outermost sapce biasing the valve balls individually against the respective seats of said valve bodies in said outermost spaces, said valve bodies each having a projection for engaging one of said shoulders, the second resilient means biasing said ball valves biasing the valve bodies against said shoulders resiliently holding them in axial position with the projections seated against said shoulders, said housing having a closed second bore, two back-pressure valves axially spaced in said second bore defining in said second bore an intermediate space and two outermost spaces, said back-pressure valves having valve elements biased to closed positions closing communication between the intermediate space and the outermost spaces, a floating piston in said intermediate space dividing said intermediate space into two axially spaced subspaces, said piston having means at opposite ends for unseating both said valve elements individually in dependence upon the direction of axial travel of said piston, said housing having two ports in communication with individual ones of said subspaces for applying hydraulic fluid under pressure to said two subspaces to unseat one of said valve elements and cause travel of said piston to unseat the other of said valve elements whereby said subspaces are placed in communication with the outermost spaces of said second bore, means providing communication between the individual subspaces and a corresponding individual one of said ports, said housing having a passageway terminating in a port providing communication and a flow path between the intermediate space of said first bore and a port on said housing, each of said valve bodies in said first bore having the pairs of passageways arranged such that one pair of passageways provides flow paths for flow of fluid from said intermediate space of said first bore to a corresponding outermost space of said first bore associated with said valve body and the other pair of passageways provide fluid flow paths from said associated outermost space of said first bore to said intermediate space of said first bore under control of the respective ball valves and said first resilient means, said housing having two other ports and two passageways between said other ports and said intermediate space of said first bore and providing communication between said other ports and said outermost spaces of said second bore.

2. A unitary hydraulic valve unit according to claim 1, in which said first resilient means in said intermediate space of said first bore comprises a single spring.

3. A unitary hydraulic valve unit according to claim 1, in which the passageways through the valve bodies are formed in each body offset 90° with respect to an adjacent passageway around the axis of said first bore.

4. A unitary hydraulic valve unit according to claim 1, in which each of said valve bodies in said first bore has a barrel-shaped configuration.

5. A unitary hydraulic valve unit according to claim 1, in which said valve bodies are constructed alike and are disposed coaxially.

6. A unitary hydraulic valve unit according to claim 1, including removable plugs closing the opposite ends of each of said first bore and said second bore.

7. A unitary hydraulic valve unit according to claim 1, in which each valve body in said first bore has a barrel-shape configuration and the passageways therein are inclined relative to the axis of said first bore and each offset 90° with respect to an adjacent passageway around the axis of said first bore.

References Cited

UNITED STATES PATENTS

| 730,085 | 6/1903 | Berg | 137—512.5 |
| 2,121,936 | 6/1938 | Thomas | 137—496 |
| 2,516,782 | 7/1950 | Magrum | 137—493.8 |
| 3,085,796 | 4/1963 | Wettstein | 137—493.9 |

FOREIGN PATENTS 1,165,783  10/1958  France.

WILLIAM F. O'DEA, Primary Examiner.

WILLIAM H. WRIGHT, Assistant Examiner.

U.S. Cl. X.R.

137—493.7, 493.9, 496, 512.1, 512.5, 614.21, 625.68